United States Patent
Kobashi et al.

[11] 3,827,763
[45] Aug. 6, 1974

[54] CONTROL VALVE ASSEMBLIES FOR HYDRAULIC BRAKE SYSTEMS OF AUTOMOBILES

[75] Inventors: Uichiro Kobashi, Okazaki; Masami Inada, Aichi; Katsuki Takayama, Chiryu, all of Japan

[73] Assignee: Aisin Seiki Kabushiki Kaisha, Kariya, Japan

[22] Filed: Feb. 26, 1973

[21] Appl. No.: 335,759

[30] Foreign Application Priority Data
Mar. 6, 1972  Japan................ 47-22973

[52] U.S. Cl. .................... 303/21 F, 188/181 A
[51] Int. Cl. ............................... B60t 8/12
[58] Field of Search ......... 303/21 F, 21 CG, 61–63, 303/68–69; 188/181 A

[56] References Cited
UNITED STATES PATENTS
| | | | |
|---|---|---|---|
| 3,524,683 | 8/1970 | Stelzer | 303/21 F |
| 3,556,608 | 1/1971 | MacDuff et al. | 303/21 F |
| 3,578,820 | 5/1971 | Riordan | 188/181 A |
| 3,729,235 | 4/1973 | Bach et al. | 303/21 F |
| 3,761,140 | 9/1973 | Lewis | 303/21 F |

Primary Examiner—Duane A. Reger
Assistant Examiner—D. C. Butler
Attorney, Agent, or Firm—Waters, Roditi, Schwartz & Nissen

[57] ABSTRACT

A control valve for an automotive vehicle having a hydraulic power braking system comprising a valve body, a power piston to apply braking pressure force to the wheel cylinders, a pressurizing chamber in which is received the power cylinder, first valve means to control the braking pressure on the known skid sensing mechanism, and second valve means manually operable by the operator to control the application of the braking pressure from source means. A bypath passage is provided to reduce fluid pressure within the pressurizing chamber independently of the second valve means so that reduction of fluid pressure in the chamber is performed without any influence of varying lift of the second valve means upon or just prior to the locking of the brakes, uniformity of skid preventing operation resulting therefrom.

5 Claims, 3 Drawing Figures

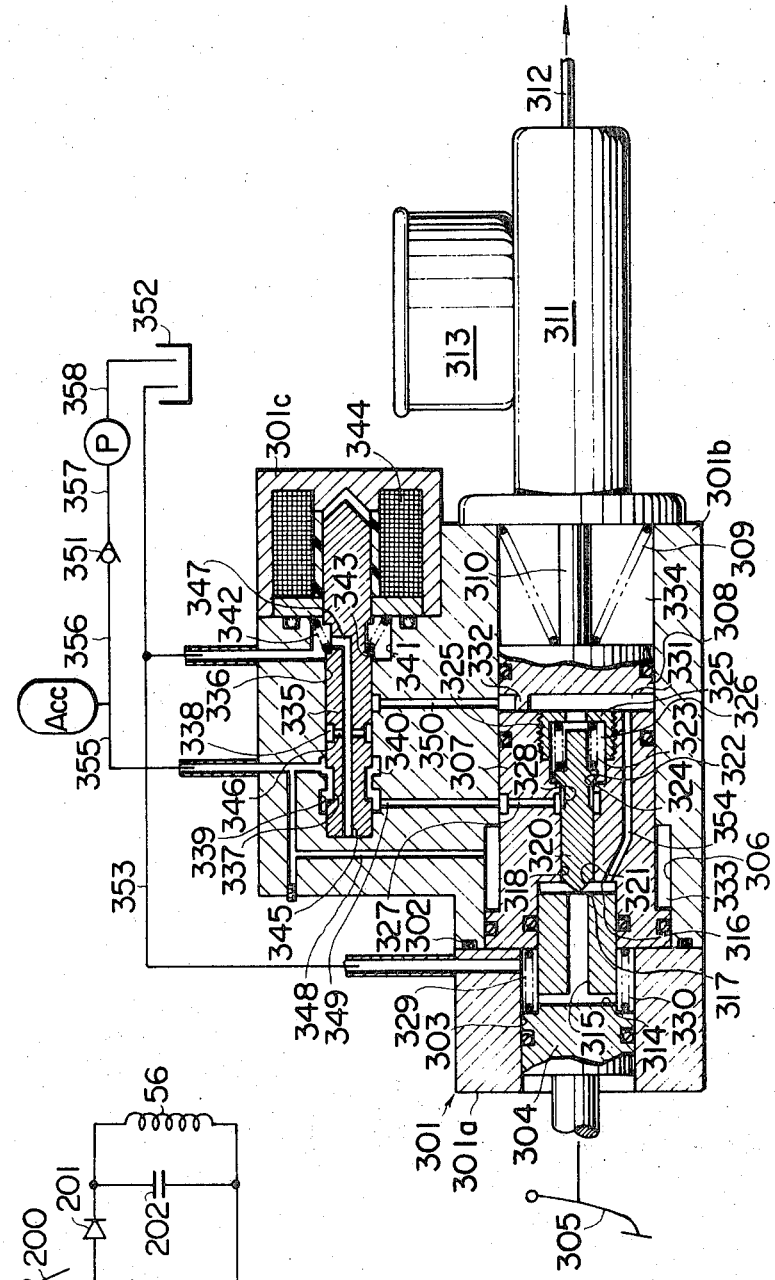

CONTROL VALVE ASSEMBLIES FOR HYDRAULIC BRAKE SYSTEMS OF AUTOMOBILES

BACKGROUND OF THE INVENTION

This invention relates to a control valve for a hydraulic power brake system, and more particularly, to a device for preventing locking of the hydraulic power brake system of a motor vehicle.

Heretofore braking-force regulators have been known for reducing the force applied to the brake drum or disk of a motor-vehicle wheel upon or just prior to locking of the latter so that skidding or slipping of the wheel is obviated.

In order to prevent any locking of the brakes of motor vehicle, it is essential to rapidly reduce fluid pressure within the wheel brake cylinders independently of varying magnitude of depression of the pedal, upon or just prior to locking of the motor-vehicle wheel.

It will be noted that rapid re-pressurization is also essential within the brake cylinders as soon as the slippage or skidding of the wheel ceased to obviate a useless travel throughout the braking action.

It should be noted that, for a given magnitude of pressure, the flowing speed of fluid is proportional to a valve lift or rise through which the fluid passes, so that larger the lift, the greater will be the speed.

Usually, prior-art devices of this type were provided with no means to fall such fluid pressure within the wheel brake cylinders quickly and independently of the varying magnitude of valve lift or rise.

SUMMARY OF THE INVENTION

It is an object of the present invention to provide control valve for a hydraulic power brake system for controlling the pressure applied to a brake cylinder.

Another object of the invention is to provide a device of the character described in which an additional bypath passage is provided within the control valve and no valve means the lift or rise of which varies in dependency upon depression of the pedal is provided in the passage so that reduction of fluid pressure is always presented within the brake cylinders independently of the varying magnitude of depression of the pedal in the skid preventing mode of operation.

Still another object of the invention is to provide a device of the character in which the bypath passage serves also to transmit fluid pressure into the pressurizing chamber in the control valve immediately after skidding of the wheel ceased for rapidly recovering the braking force applied to the brake drum or disk of a motor-vehicle wheel.

Thus, in the disclosed embodiments, source means of high pressure fluid, reservoir means of atmospheric pressure fluid, skid sensing mechanism of usual type, a valve body having a pair of first and second piston housings aligned in end-to-end relationship, first valve means to block output fluid pressure from said source means in response to an input from said skid sensing mechanism, power piston to apply the braking pressure to the wheel brake cylinders, and second valve means are provided. The control valve of the invention is further provided with a reaction piston slidably received within said first piston housing, a manually operable piston slidably received within said second piston housing and formed in its end face a blind bore to slidably receive therein the end portion of said reaction piston and a power piston slidably received within the second piston housing normally spring-biased toward abutment against said manually operable piston and in turn against a stopper means formed in said second piston housing and having a projection in its end face to ensure a pressurizing chamber between the manually operable piston and the power piston. The second valve means includes a pair of first and second valve members to seat and unseat due to the same shift of said reaction piston respectively throughout braking action. The manually operable piston is formed with a first passage to connect said pressurizing chamber via said first valve member to said reservoir means, and a second passage to connect the pressurizing chamber via the second valve member to said source means. The control valve is still provided with a bypath passage from said pressurizing chamber to said reservoir via the said first valve means to perform the principal operation of the control valve to bring the pressurizing chamber into communication with the reservoir means in response to the input from said skid sensing mechanism upon or just prior to locking of the brakes, thus releasing the brake of the motor vehicle.

BRIEF DESCRIPTION OF THE DRAWING

FIG. 2 is a schematic circuit diagram usable with the control valve of FIG. 1; and FIG. 3 is a view similar to that of FIG. 1 showing another embodiment of the present invention.

DESCRIPTION OF THE PREFERRED EMBODIMENTS

Figure 1:
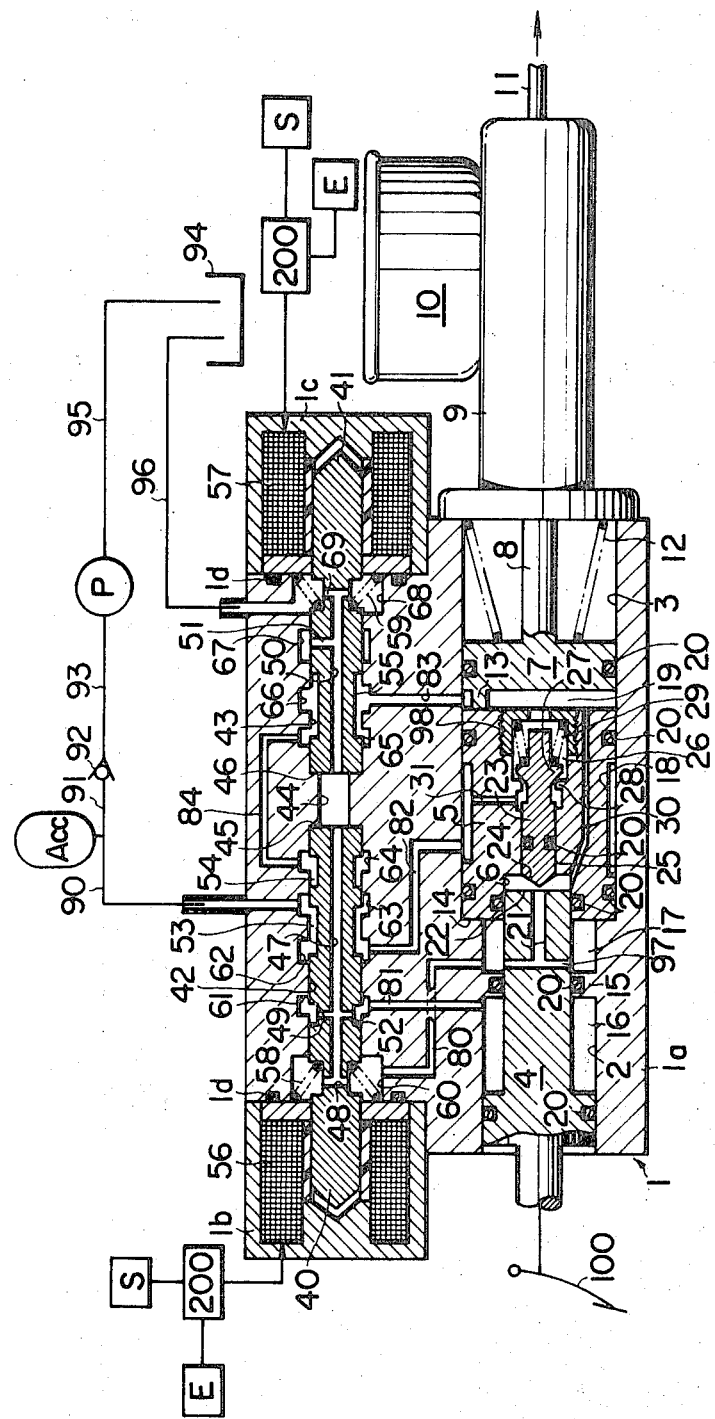
FIG. 1 is an axial cross-sectional view of a control valve, according to the invention, with the remaining parts of the brake system shown only diagrammatically.

Referring now to FIG. 1, a control valve body generally indicated by the numeral 1 consists of three parts 1a, 1b and 1c firmly and liquid-tightly connected to each other by means of bolts not shown and seals 1d. The control valve body 1 comprises at its lower portion a pair of first piston housing 2 and second piston housing 3 coaxially aligned in end-to-end relationship. A reaction piston 4 and manuallly operable piston 5 are slidably received within the housings 3 and 4 respectively and right end portion of the reaction piston 4 is also slidably but fluid-tightly received within a blind bore 6 formed in the left end face of the piston 5. The piston housing 3 further receives therein a power piston 7 from which extends a stem 8 toward the right to operatively connect with a piston (not shown) within the master cylinder 9 for pressurizing fluid therein so that a braking fluid pressure is exerted within the usual wheel brake cylinders. The reference character 10 indicates the known reservoir for the braking fluid and reference character 11 indicates a conduit transmitting the fluid pressure in the master cylinder to the wheel cylinders of a brake system of an automotive vehicle. A restoring spring 12 is under compression between the power piston 7 and the end face of the second cylinder housing 3 to normally urge the piston 7 against the manually operable piston 5 through a projection 13 and to thereby urge the piston 5 against the shoulder 14 bordering the second piston housing 3 from the second piston housing 2. An annular shoulder or rib 15 is formed in the inner surface of the first housing 2 to form a locking chamber 16 and a chamber 17 between the first piston housing 2 and the stepped reaction piston 4. Referring now to the power piston 7, the projection 13 in its end face serves to form between the piston 5 and the power piston 7 a pressurizing chamber 19 in cooperation with the second piston housing 3. The manually operable piston, which will be referred to as manual piston hereinafter, has in its outer surface a wide ring groove 18. The sealing rings 20 are provided to ensure that the locking chamber 16, chamber 17, wide ring groove 18 and pressurizing chamber 19 may be fluid-tight. The reaction piston 4 has an axial bore 21 and a radial bore 97 crossed the axial bore 21 to provide a passage from the blind bore 6 to the annular chamber 17 around the piston 4. The axial bore 21 provides at the right hand end thereof a valve seat 22 for a valve face 24 of valve means 23 slidably and fluid-tightly received within an axial bore 25, of the manual piston 5. The valve face 24 and the seat 22 provide a valve assembly which will be referred to as a first valve member of second valve means 23 as described hereinafter. The axial bore 25 connects with a compartment 26 within which is positioned a frust conical valve 27 of the valve means 23 for engagement with a valve seat 28 formed in the wall of the compartment 26. The frust conical valve 27 and the seat 28 provide a second valve member assembly as hereinafter referred to as a second valve member of the second valve means 23. A spring 29 is under compression between the back of the frust conical valve 27 and the end surface of a cap 98 threaded into the compartment 26 so that the frust conical valve 27 is normally urged to engage the seat 28 as shown in the view. The piston 5 is provided with another axial bore 30 to provide a passage from the chamber 19 to the blind bore 6. The piston is further provided with a radial bore 31 to connect the chamber or groove 18 to the compartment 26.

The valve body 1 is provided with at its upper portion a pair of electro-magnetically operable valve members 40 and 41 to slide fluid tightly within corresponding bores 42 and 43 respectively. The two members 40 and 41 form first valve means as hereinafter will be referred to. The bores 42 and 43 are arranged coaxially and in end-to-end relationship. A smaller diameter bore 44 is provided to communicate the two bores 42 and 43 while presenting stopper means 45 and 46 for the valve members 40 and 41 respectively. The two valve members 40 and 41 serve as core member at their outer end portion for the coils 57 and 56 respectively when the coils are energized to move the corresponding cores in opposition to their respective restoring springs 58 and 59 which will be described in detail hereinafter. In the internal surface of the bore 42 are formed five annular grooves 60 to 64. In the internal surface of the bore 43 are formed four annular grooves 65 to 68. The restoring spring 58 is under compression between the end surface of the annular groove 60 and a shoulder of the valve member 40 to normally spring-bias the valve member 40 against the stopper shoulder 45 so that the valve member is in its rest position as shown in the view. The other restoring spring 59 is under compression between the end surface of the annular groove 68 and a shoulder formed in the outer surface of the valve member 41 so that the member is normally spring-biased against the stopper shoulder 46 in the rest position. Path 80 interconnects the annular groove 60 and the lower chamber 17; path 81 interconnects the annular groove 61 and the chamber 16; path 82 interconnects the annular groove 62 and the ring groove or chamber 18; and path 83 interconnects the annular groove 66 and the chamber 19. The annular groove 64 and 65 are together communicated to each other by a path 84.

An accumulator Acc is connected to the annular groove 63 via transmission line 90 and to a pump P via transmission line 91, a check valve 92 and a transmission line 93. The pump is connected to a reservoir 94 via a transmission line 95. The annular groove 68 is connected with the reservoir via a transmission line 96.

Referring now to the piston 4, a brake pedal 100 is operatively connected to the piston 4 as shown schematically in the FIG. 1.

The operation of the control valve illustrated in FIG. 1 will be more readily understood from a description of the electrical circuit which may be embodied therein and is illustrated in FIG. 2. The circuit shown in the view includes switch 200 operable in response to the known skid sensing mechanisms to connect any electrical source E to the coil 57 and the coil 57 is in turn connected to ground. The other coil 56 is connected to the electric supply source E via diode 201 and the switch 200 while on the other hand being connected to ground. A capacitor 202 provides a circuit, such as time delay circuit, to leave the coil 56 energized for a little while just after the switch 200 is opened.

In operation, the individual parts of the control valve are in their position in FIG. 1 immediately before the depressing of the pedal 100 by the driver. When the operator depresses the brake pedal 100, the reaction piston 4 is moved to the right to urge the valve seat 22 into engagement with the valve face 24, thus blocking the first communication line from the chamber 19 to the reservoir 94 via bore 30, blind bore 6, axial bore 21, radial bore 97, chamber 17, path 80, annular groove 60, radial bore 48, axial bore 47, bore 44, axial bore 50, radial bore 69, annular groove 68 and transmission line 96. An additional force applied to the brake pedal results in the disengagement of the valve face 27 from the valve seat 28 in opposition to the force of the spring 29. The pressure of fluid is thus transmitted through a second communication line from the accumulator Acc via transmission line 90, annular groove 63, ring groove 53, annular groove 62, path 82, chamber 18, radial bore 31, valve 27 and seat 28, and compartment 26 into the pressurizing chamber 19. The pressure of fluid within the chamber 19 is then transmitted via the power piston 7 and stud 8 to the piston within the master cylinder 9 and in turn to the known brake cylinders not shown through the conduit 11.

During the operation of the brake pedal 100 the reaction force against the operator's foot is the force of the hydraulic fluid in the blind bore 6 applied to a cross sectional area of the reaction piston 4, the operator becoming aware of the brake force which is proportional to that reaction force.

The coil 56 is energized in response to an input from the skid sensing mechanism S to bring the valve member 40 to displacement apart from the stopper shoulder 45 and accordingly to cut the passage between the annular grooves 62 and 63 so that the second communication line is blocked. The fluid pressure from the accumulator Acc to the chamber 19 is thus intercepted.

The other coil 57 is also energized in response to the same input as that of the coil 56 to bring the valve member 41 to displacement apart from the stopper shoulder 46 and accordingly to interconnect the annular grooves 66 and 67. The fluid pressure within the chamber 19 is thus discharged to the reservoir through the bypath passage from the chamber 19 via path 83, annular groove 66, ring groove 55, annular groove 67, radial bore 51, axial bore 50, radial bore 69, compartment 68 and transmission line 96 into the reservoir 94. The braking force applied to the brake drum or disk of a motor-vehicle wheel is therefore reduced to prevent the wheel from locking so that skidding or slipping of the wheel is obviated.

Upon release of the brake pedal 100 the reaction piston 4 returns to the position illustrated whereupon in turn the valve member 23 shifts to the left. The displacement of the valve member 23 bring its acting face 27 into engagement with the seat 28 so that the afore mentioned second communication line is blocked and application of fluid pressure from the accumulator Acc is cut off. Subsequently to the engagement of the valve face 27, the valve seat 22 disengages from the valve face 24 whereby the chamber 19 is brought into communication with the reservoir 94, which is of atmospheric pressure, through the aforementioned first communication line. The fluid pressure within the wheel brake cylinders thus falls to release the wheel brakes.

It should be noted that the locking chamber 16 around the reaction piston 4 is connected with the reservoir 94 in the normal mode of operation via path 81, annular groove 61, radial bore 49, axial bore 47, bore 44, radial bore 50, radial bore 69, compartment 68 and transmission line 96. No objection is presented to the movement of the reaction piston 4 throughout the braking action in the normal mode of braking operation. The chamber 16 is however closed when the coil 56 is energized and the above mentioned passage is accordingly blocked. The reaction piston 4 is thereafter prevented from further forward movement. This provides means to save forward movement of the piston 4 against subsequent forward movement possibly required to open the second communication line for re-pressurizing the chamber 19 throughout the braking action. When the switch 200 is opened upon a cease of the skid, the coil 57 is rapidly de-energized while the capacitor 202 remains charged and thence the coil 56 still remains energized for a little while in proportion to a given charge of the capacitor 202. The valve member 41 returns immediately to the position illustrated in FIG. 1 but the other valve member 40 still remains in the left acting position so that the accumulator Acc and the chamber 19 is interconnected via transmission line 90, annular groove 63, ring groove 54, annular groove 64, path 84, annular groove 65, ring groove 55, annular groove 66 and path 83. Rapid re-pressurization of the chamber 19 is thus obtained independently of the second communication line.

From the foregoing it will be apparent that reduction of fluid pressure within the chamber 19 is performed in the skid preventing mode of operation independently of varying rise or lift of the valve 24 or 27. Further, it will be noted that re-pressurization of the chamber 19 when the skid ceased is also independently of such varying rise or lift of the valve 24 or 27. This is advantageous to acquire uniformity of skid preventing and brake reviving operation throughout any braking action.

Even when there is a break down in the pump or the accumulator Acc to cause the pressure source for the hydraulic fluid to fail, the control valve will act as a manually operable valve. When the brake pedal 100 is depressed, the piston 4 abuts against the other piston 5 causing the valve member 24 to seat and the spring 29 to be compressed. Further depression of the brake pedal results in the displacement of the power piston 7 due to contact with the projection 13, and this in turn displace the piston within the master cylinder 9 through the stem 8. The hydraulic pressure in the master cylinder 9 is thus increased.

Another embodiment illustrated in FIG. 3 is of generally identical construction with that of the embodiment in FIG. 1. Valve body generally indicated by the numeral 301 consists of three pieces 301a, 301b and 301c. The three pieces are together connected firmly and fluid tightly to each other by means of usual bolt members (not shown) and sealing members 302. Within cylinder housing 303 is received a piston 304 operatively connected to the usual pedal 305 schematically shown in FIG. 3. The body 1 is further provided with another stepped cylinder housing 306 within which is slidably received a correspondingly stepped piston 307. Further, the other power piston 308 is also slidably received within the cylinder housing 306 which is normally urged against the piston 307 by a spring 309 under compression between the piston 307 and end face of the housing 306 causing the piston 307 to abut against the piece 301a. A stem 310 extends from the power piston 308 and is operatively connected to a piston received within the usual master cylinder 311 within which is pressurized in operation the braking fluid to transmit thereof to the brake wheel cylinders (not shown) through a transmitting line 312. The numeral 313 indicates the known reservoir to supply the braking fluid to the master cylinder 311.

Referring to the piston 304, a radial bore 314 and an axial bore 315 are provided in the piston and communicated to each other. The right hand end portion of the piston 304 is slidably received within a blind bore 316 of the piston 307. The right hand end of the axial bore 315 provides a valve seat 317 for a valve face which is hereinafter described. The piston 307 is also provided with an axial bore 318 within which is received slidably a valve 320. The valve 320 has a valve face 321 and frust conical valve face 322. The valve face 322 is normally spring biased against the valve seat 324 by a spring 323 which is under compression between the back of the valve face and a cap 325 threaded into a compartment 326 at the end of the axial bore 318. The piston 307 has a radial bore 327 which provides a passage from outside of the piston 307 and ring groove 328 formed in the periphery surface of the valve 320. Between the stepped piston 304 and the other stepped manual piston 307 is spring 329 which is under compression. The spring 329 is of lesser strength than the spring 309 and is normally overcome by the large spring 309 so that the three pistons are in their positions shown in the Figure respectively, when the valve is in the rest position. A chamber 330 is formed between the piston 304 and the cylinder housing 301a and another chamber 331 is formed between the manual piston 307 and power piston 308 in the rest position of the control piston as will be seen in the view. A projection 322 is provided in the end face of the power piston 308 so that necessarily sized chamber 331 is ensured in the rest position. Further, annular chamber is provided around the piston 307 as indicated by the numeral 333 and a chamber 334 is formed between the power piston and end face of the bore 306. The chamber 334 is communicated to the atmospheric pressure by any suitable conduit means not shown.

In the upper portion of the body 301, a valve 335 is provided to slide within the bore 336. The valve 335 is formed with two ring grooves in its surface as indicated by the numerals 337 and 338. Three annular grooves 339 to 341 are formed in internal surface of the bore 336. A restoring spring 342 is under compression between a shoulder 343 of the valve 335 and end face of the compartment 341 so that the valve 335 is normally spring biased toward the left as illustrated in FIG. 3. The valve 335 provides core means at its right end portion for a coil 344 to electromagnetically displace the core or valve 335 to the right in the view when an input is applied thereto from the skid sensing mechanism. The valve 335 is further provided with an axial bore 345 and two radial bores 346 and 347. The radial bore 346 corresponds to the ring groove 338 of the valve 335. A path 348 interconnects the chamber 333 and the annular groove 340; path 349 interconnects the radial bore 327 and the annular groove 339 and the path 350 interconnects the chamber 331 and the ring groove 338 when the valve 335 is in the skid preventing position.

A pump P connects with the annular groove 340 via transmission line 357, check valve 351, transmission line 356, accumulator Acc, and transmission line 355. A reservoir 352 communicates with both the chamber 330 around the piston 304 and the compartment 341 via transmission line 353.

In operation, when the pedal 305 is depressed, the piston 304 is first displaced to the right and the seat 317 engages the valve face 321, thus blocking the first communication line from the reservoir 352, via transmission line 353, chamber 330, radial bore 314, axial bore 315, blind bore 316, bore 354 to the chamber 331. Further depression of the pedal results in unseat of the frust conical valve 322. The chamber 331 is thereby connected with the accumulator through the second communication line from the chamber via compartment 326, unseated valve 322, ring groove 328, radial bore 327, path 349, annular groove 339, ring groove 337, annular groove 340 and transmission line 355 to the accumulator. Fluid pressure is thus applied within the chamber 331 causing the power piston 308 to displace to the right. Fluid within the master cylinder 311 is thereby pressurized to transmit the pressure to the wheel cylinders.

Upon input from the skid sensing mechanism, the coil 344 is energized and the valve or core 355 is displaced to its acting position from the rest position illustrated. The passage from the accumulator Acc to the chamber 331, the second communication line, is blocked and the bypath passage is provided from the chamber 311 to the reservoir 352 via path 350, ring groove 338, radial bore 346, axial bore 345, radial bore 347, compartment 341 and transmission line 353. The pressure within the chamber 331 thus falls rapidly to release the brakes of the vehicle.

Further operation of the embodiment will be readily apparent to those skilled in the art from the foregoing without any further description.

What is claimed is:

1. A control valve for an automotive vehicle having a hydraulic power braking system comprising;
   source means of high pressure fluid,
   reservoir means of atmospheric pressure fluid,
   skid sensing mechanism,
   a valve body having a pair of first and second piston housings aligned in end-to-end relationship,
   first valve means to block output fluid pressure from said source means in response to an input from said skid sensing mechanism,
   a reaction piston slidably received within said first piston housing,
   a manually operable piston slidably received within said second piston housing and formed in its end face a blind bore to slidably receive therein the end portion of said reaction piston,
   a power piston slidably received within said second piston housing normally spring biased toward abutment against said manually operable piston and in turn against a stopper means formed in said second piston housing and having a projection in its end face to ensure a pressurizing chamber between said manually operable piston and said power piston,
   second valve means including a pair of first and second valve members to respectively seat and unseat due to the same shift of said reaction piston throughout braking action,
   said manually operable piston being formed with a first passage to connect said pressurizing chamber via said first valve member to said reservoir means, and a second passage to connect said chamber via said second valve member to said source means,
   a bypath passage from said pressurizing chamber to said reservoir via said first valve means, whereby said pressurizing chamber is brought into communication with said reservoir means through said bypath passage past said first valve means in response to the input from said skid sensing mechanism upon or just prior to blocking of the brakes.

2. A control valve according to claim 1, wherein said first valve means comprises a pair of first and second electro-magnetically operable valve members both operable in response to an electric input from said skid sensing mechanism, each said electro-magnetically operable valve member including an electro-magneto, said electro-magneto of said first electro-magnetically operable valve member being a time delay electromagneto, and said bypath passage comprises said second electro-magnetically operable valve member and has a branch passage to interconnect said second and first electro-magnetically operable valve members, whereby said electro-magneto of said first electromagnetically operable valve member is left energized for a while just after the other electro-magneto is de-energized to cause said pressurizing chamber to be brought into communication with said source means just after the skid ceased via a portion of said bypath passage, said second electro-magnetically operable member, said branch passage and said first electro-magnetically operable valve member until the pressurizing chamber is late brought into communication with said source means through said second passage.

3. A control valve according to claim 2, wherein said reaction piston is formed in stepped shape to provide an annular locking chamber between said first piston housing and said reaction piston, said locking chamber being connected to said reservoir means in normal braking mode of operation through said first electromagnetically operable valve member while being closed in skid preventing mode of operation to thereby prevent further movement of said reaction piston for saving forward movement thereof against subsequent forward movement possibly required to open said second passage for re-pressurizing said pressurizing chamber throughout braking action.

4. A control valve according to claim 1 wherein said first valve means comprises a single electromagnetically operable valve member so arranged as to simultaneously block and open said second passage and bypath passage respectively in response to an electric input from said skid sensing mechanism.

5. A control valve according to claim 4, wherein said manually operable piston is in stepped form to provide an annular locking chamber between said second piston housing and said manually operable piston, said locking chamber being always connected to said source means so that said manually operable piston is locked in its regular position in the normal mode of operation while being moved to shift power piston in case of accidental failure of the output fluid pressure from said source means so as to cause the control valve to operate as a manually operable usual master cylinder for braking system of an automotive vehicle.

* * * * *